United States Patent
Vanderheyden

(12) 
(10) Patent No.: US 6,985,328 B2
(45) Date of Patent: Jan. 10, 2006

(54) ONE AND THREE QUARTERS INCH FORM FACTOR TAPE CARTRIDGE AUTOLOADER

(75) Inventor: William J. Vanderheyden, Loveland, CO (US)

(73) Assignee: Quantum Corporation, Milpitas, CA (US)

( * ) Notice: Subject to any disclaimer, the term of this patent is extended or adjusted under 35 U.S.C. 154(b) by 369 days.

(21) Appl. No.: 10/191,216

(22) Filed: Jul. 9, 2002

(65) Prior Publication Data

US 2004/0008445 A1 Jan. 15, 2004

(51) Int. Cl.
*G11B 17/22* (2006.01)

(52) U.S. Cl. ....................................................... 360/92
(58) Field of Classification Search ................... 360/92, 360/98.04, 98.05; 369/30.4, 30.45, 30.47, 369/30.48, 30.5, 30.65, 30.66, 30.67, 30.68, 369/30.7, 30.71, 30.72; 720/652
See application file for complete search history.

(56) References Cited

U.S. PATENT DOCUMENTS

| | | | | |
|---|---|---|---|---|
| 5,515,356 A | * | 5/1996 | Lee | 369/30.45 |
| 5,995,320 A | * | 11/1999 | Ostwald | |
| 6,027,296 A | * | 2/2000 | Meier | 414/281 |
| 6,038,099 A | * | 3/2000 | Heinze et al. | |
| 6,155,766 A | * | 12/2000 | Ostwald et al. | 414/279 |
| 6,222,699 B1 | | 4/2001 | Luffel et al. | |
| 6,229,666 B1 | * | 5/2001 | Schneider et al. | |
| 6,381,089 B1 | | 4/2002 | Helmick et al. | |
| 6,643,091 B2 | * | 11/2003 | Coffin et al. | 360/92 |
| 6,754,037 B1 | * | 6/2004 | Ostwald et al. | 360/92 |
| 2002/0057513 A1 | * | 5/2002 | Porter et al. | 360/69 |
| 2002/0071352 A1 | | 6/2002 | Ostwald | |
| 2002/0080513 A1 | * | 6/2002 | Steinhilber | 360/69 |
| 2002/0085308 A1 | * | 7/2002 | Paulat | 360/92 |
| 2002/0085458 A1 | * | 7/2002 | Luffel et al. | 369/30.43 |
| 2002/0114103 A1 | * | 8/2002 | Coffin et al. | 360/92 |
| 2002/0118482 A1 | * | 8/2002 | Steinhilber | 360/69 |
| 2002/0149870 A1 | * | 10/2002 | Steinhilber | 360/69 |
| 2003/0039180 A1 | * | 2/2003 | Mueller et al. | 369/30.41 |
| 2003/0048572 A1 | * | 3/2003 | Benson et al. | 360/92 |
| 2003/0086202 A1 | * | 5/2003 | Hoelsaeter et al. | 360/92 |
| 2003/0112549 A1 | * | 6/2003 | Hoelsaeter et al. | 360/92 |
| 2003/0123184 A1 | * | 7/2003 | Ostwald et al. | 360/92 |
| 2003/0174434 A1 | * | 9/2003 | Hoelsaeter et al. | 360/92 |
| 2003/0227708 A1 | * | 12/2003 | Luffel | 360/92 |

* cited by examiner

*Primary Examiner*—William J Klimowicz
(74) *Attorney, Agent, or Firm*—Patton Boggs LLP

(57) ABSTRACT

The tape cartridge autoloader comprises a tape drive and up to eight respective storage positions for tape cartridges all located within a one and three-quarter inch form factor. A picker driven by a single first motor operated driving mechanism follows a U-shaped track as the picker transfers a predetermined one of the tape cartridges between one of the respective storage positions and the tape drive. The picker having a retractable arm driven by a single motor for engaging with the tape cartridge and for moving the tape cartridge from/to the picker. A retractable drawer or removable magazine allows one or more tape cartridges to be loaded/unloaded in the tape cartridge autoloader.

20 Claims, 9 Drawing Sheets

ONE AND THREE QUARTERS INCH FORM FACTOR TAPE CARTRIDGE AUTOLOADER

FIELD OF THE INVENTION

The present invention relates generally to peripheral memory storage devices for computer systems, and more particularly, to a single height multiple magnetic tape cartridge autoloader.

PROBLEM

It is a problem in the field of magnetic tape cartridge autoloaders to increase the magnetic tape storage density while decreasing the equipment storage area required for the magnetic tape cartridge autoloaders. Magnetic tape cartridge autoloaders, also referred to as libraries, are widely accepted because they combine multiple magnetic tape cartridges and a tape drive within a single chassis for higher data storage capacity. Typically, prior art tape cartridge autoloaders have an array of storage positions for tape cartridges, one or more tape drives, and some type of automated changer or cartridge transport for picking or gripping a tape cartridge and moving the tape cartridge between a storage position and the tape drive. The robotic mechanism, often called a "picker" or "gripper", is typically mounted to the autoloader chassis relative to the tape drive in order to move the tape cartridges between a storage position and the tape drive.

A problem occurs when decreasing the height of the tape cartridge autoloader since operation requires one or more motor mechanisms for moving the tape drive read/write head to read from and write to each of the multiple magnetic tape cartridges. Likewise, one or more motor mechanisms are required to transport the tape cartridges to and from the tape drive. Another problem occurs when increasing the number of magnetic tape cartridges available within the tape cartridge autoloader without increasing the height and the complexity of the tape cartridge autoloader.

Vertically Orientated Tape Cartridge Autoloader

Heinze, et al, (U.S. Pat. No. 6,038,099) discloses a tape cartridge autoloader that includes a drive plate for positioning the tape drive. In Heinze, the tape cartridges are horizontally stacked one above the other in a removable magazine and the read/write head is transported up and down to read/write data from/to the tape media enclosed within the tape cartridges. While the tape cartridge autoloader disclosed in Heinze allows multiple tape cartridges to be accessed by a single read/write head, the height of the tape cartridge autoloader is contingent on the number of tape cartridges that the magazine houses. Increasing the number of tape cartridges increases the height of the tape cartridge autoloader. Additionally, valuable space within the chassis is utilized to move the read/write head up and down for reading from or writing to each of the tape cartridges.

A second type of tape cartridge autoloader accommodates multiple tape cartridges and transports the tape cartridge to the stationary tape drive for reading/writing data from/to the tape media enclosed within the tape cartridge. The tape cartridge autoloader disclosed in Schneider, et al., (U.S. Pat. No. 6,229,666) pivots the tape drive about an axis. The multiple tape cartridges are vertically stacked one above the other in a fan orientation wherein the angle of each one of the multiple tape cartridges corresponds to the angle of the pivoting tape drive. In Schneider, the tape drive pivots into alignment for loading and unloading one of the multiple tape cartridges into the tape drive. Like the tape cartridge autoloader disclosed in Heinze, the height of the tape cartridge autoloader in Schneider is contingent on the number of tape cartridges vertically stacked within the magazine. As the magazine is expanded to hold a greater number of tape cartridges, the height of the tape cartridge autoloader is increased.

While the tape cartridge autoloaders just described provide an apparatus for reading from and writing to multiple tape cartridges, they fail to provide a tape cartridge autoloader having a reduced height.

Horizontally Orientated Tape Cartridge Autoloader

A solution to the increased height of the tape cartridge autoloaders having vertically stacked tape cartridge has been to horizontally stack the tape cartridges. Ostwald (U.S. Pat. No. 5,995,320) discloses a tape cartridge autoloader that orients the tape cartridges in a horizontally oriented loading bin, or magazine. The horizontally oriented storage bin stores tape cartridges like books in a bookcase, each tape cartridge standing next to the adjacent tape cartridge. Unlike the vertically oriented tape cartridge autoloaders previously discussed, the Ostwald tape cartridge autoloader occupies a vertical space consistent with the width of the associated tape cartridges. The horizontal orientation enables the horizontally oriented tape cartridge autoloaders to be mounted in a vertical rack, thus increasing the storage capacity without increasing the vertical height.

However, a problem occurs with the horizontally oriented storage bin. While the tape cartridges are each one-half inch in height, storing the tape cartridges side-by-side increase the vertical height of the tape cartridge autoloader to the width of the tape cartridge. While this tape cartridge storage configuration increases the number of tape cartridges that may be stored in a particular vertical height, the vertical height does not conform to the standard form factor.

The use of vertical racks has become popular to reduce the space required for computer equipment servers, data storage devices, and other computer peripheral equipment. The form factor of vertical racks has been standardized to accept an equipment chassis that is approximately 19 inches wide by 28 inches deep. The "form factor" refers generally to the peripheral dimensions of the chassis. The height of the chassis is in multiples of 1.75 inches, referred to in the industry as a "U". A 1U height chassis refers to a 1.75 inch height chassis while a 2U height refers to a 3.5 inch height and so on. Peripherals and tape cartridges, such as single reel tape drives and single reel magnetic tape cartridges, also have standardized form factors. For example a single reel tape drive may have a half-high form factor. When referring to the form factor of a tape drive peripheral, the single reel tape drive is a half-high (1.5 inch high) form factor. Thus, the height of the tape drive influences the form factor of the chassis for the tape cartridge autoloaders. Installing a half-high form factor tape cartridge into a tape cartridge autoloader leaves 0.25 inch for operational components.

2U rack mount tape cartridge autoloaders that accept one inch tape cartridges are known. The know 2U tape cartridge autoloader is the 640 Blade (Trademark) tape cartridge autoloader of Benchmark Storage Solutions, the assignee of the present invention. The Benchmark 640 Blade comprises up to up to eight horizontal tape cartridges cells that are rotated in a circular motion around a centrally located tape drive. The tape drive is approximately 1.5 inches in height. In the 640 Blade, fans, motors and other structural features are located below the tape drive, thus the combination of the tape drive and components located below the tape drive influence the overall height of the tape cartridge autoloader.

The tape cartridge autoloaders discussed above fail to provide a tape cartridge autoloader that fits within a 1U form factor. Instead, the tape cartridge autoloaders either stack the tape cartridges such that the stack of tape cartridges influences the height of the tape cartridge autoloader or place the operational components below the tape drive, increasing the height of the tape cartridge autoloader.

What is needed is a 1U tape cartridge autoloader having horizontally oriented tape drive and tape cartridges with the operational components located adjacent to the tape cartridges and tape drive.

SOLUTION

The present one and three quarter form factor tape cartridge autoloader provides one tape drive and storage cells for up to eight tape cartridges. A tape cartridge loading door located on the front of the tape cartridge autoloader allows the user to insert and extract tape cartridges from the tape cartridge autoloader. A picker traveling on a U-shaped picker track transports the tape cartridges between the storage cells and the tape drive. The tape drive and the eight tape cartridge storage cells are horizontally located around the U-shaped picker track such that as the picker travels around the U-shaped picker track, the tape drive and the tape cartridge storage cells are aligned with the picker. In an embodiment, the transport cell includes a sensing device and the tape cartridge storage cell includes a corresponding cell locating tab. As the picker travels around the U-shaped picker track, the sensing device senses the cell locator tab, thus identifying the location of the picker.

Operational components for moving the picker around the U-shaped picker track include a picker motor for rotating a pinion gear that engages a toothed side of the U-shaped track. The U-shaped picker track includes a cam longitudinally down the center of the U-shaped track. A corresponding pin protruding outward from the base of the picker follows the cam as the picker motor rotates the pinion gear which engages the toothed side of the picker track. The picker operational components are mounted to the base of the picker. The picker includes a loading retractable arm for drawing the tape cartridge from the storage cell or the tape drive and into and out of the transport cell.

A second motor, a loading actuator motor, moves the retractable loading arm in and out of the transport cell. The loading arm includes an actuator extending perpendicularly outward from an elongated slot in the side of the transport cell. The loading motor rotates a set of gears that turn a toothed loading belt. An actuator hook attaches the loading arm actuator to the toothed loading belt to pushes/pulls the loading arm actuator as the toothed loading belt turns which moves the loading arm into and out of the transport cell. The picker and loading arm actuator operational components are located below the picker transport cell to reduce the height of the tape cartridge autoloader.

DETAILED DESCRIPTION

The rack mount tape cartridge autoloader summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Magnetic tape cartridge autoloaders, also referred to as libraries, are widely accepted because they combine multiple magnetic tape cartridges and a tape drive within a chassis for higher data storage capacity. With the significant growth in disk capacity on even entry level servers used in a Local Area Network and with the increasing amount of mission critical data being stored on these servers, there is a need for tape cartridge automation in the low-end server environment. Organizations seek autoloader solutions that can address the need for a full week's backup of server data, requiring five or more tape cartridges. A one-drive autoloader meets the majority of the needs in this environment.

The form factor of vertical racks has been standardized to accept an equipment chassis that is approximately 18 inches wide by 28 inches deep. The "form factor" refers generally to the peripheral dimensions of the chassis. The height of the chassis is in multiples of 1.75 inches, referred to in the industry as a "U". A 1U height chassis refers to a 1.75 inch height chassis while a 2U height refers to a 3.5 inch height and so on. Peripherals and magnetic tape cartridges, such as single reel magnetic tape cartridges and single reel tape drives, also have a standardized form factor. For example a single reel tape drive may have a half-high form factor. When referring to the form factor of a tape drive peripheral, the single reel tape drive has a half-high (1.5 inch high) form factor while the height of the single reel tape cartridge is a one-inch height. Thus, the height of the tape drive influences the form factor of the chassis for the tape cartridge autoloaders.

Figure 1:
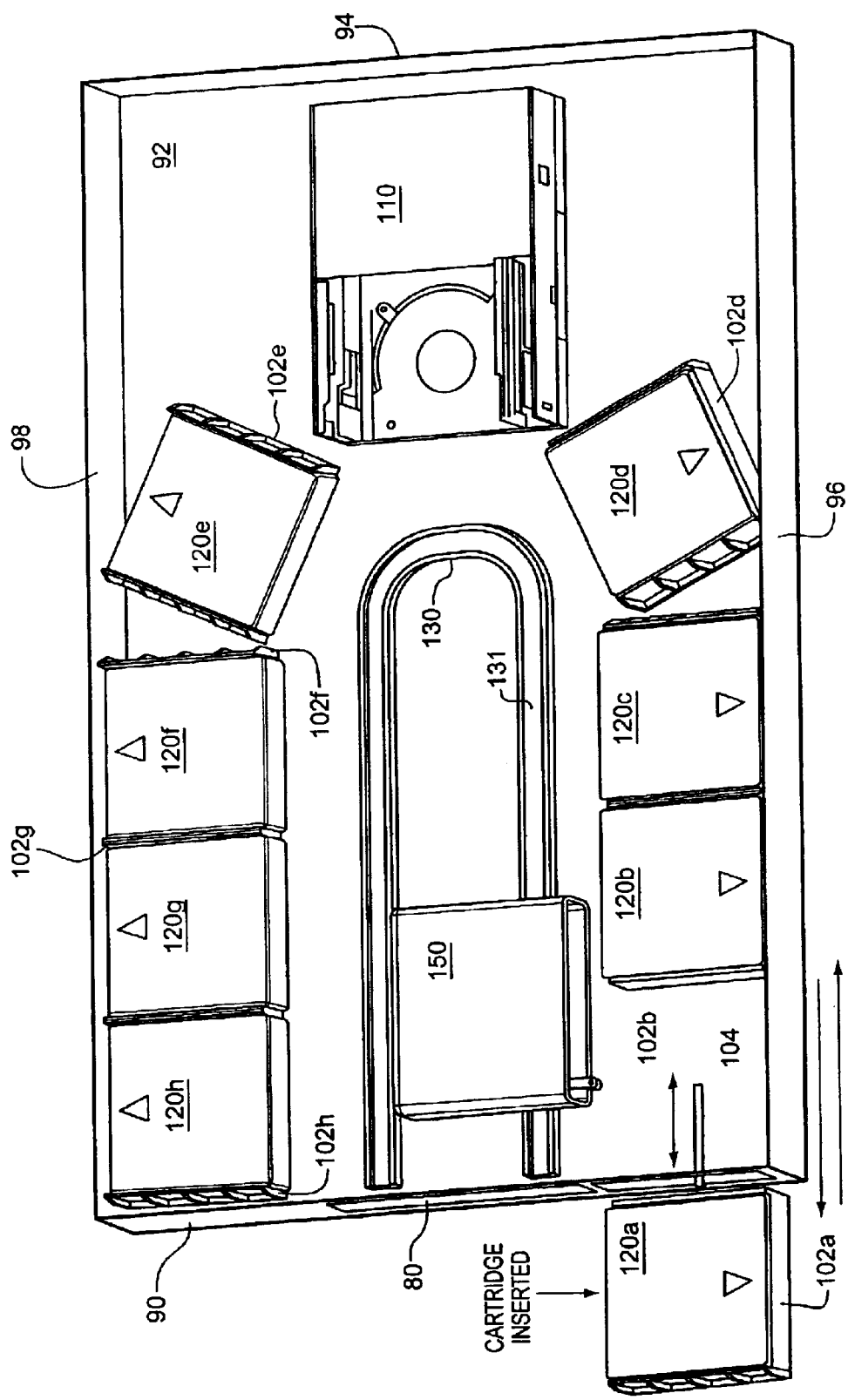
FIG. 1 illustrates a top view of the present one and three quarter form factor tape cartridge autoloader.
Figure 2:
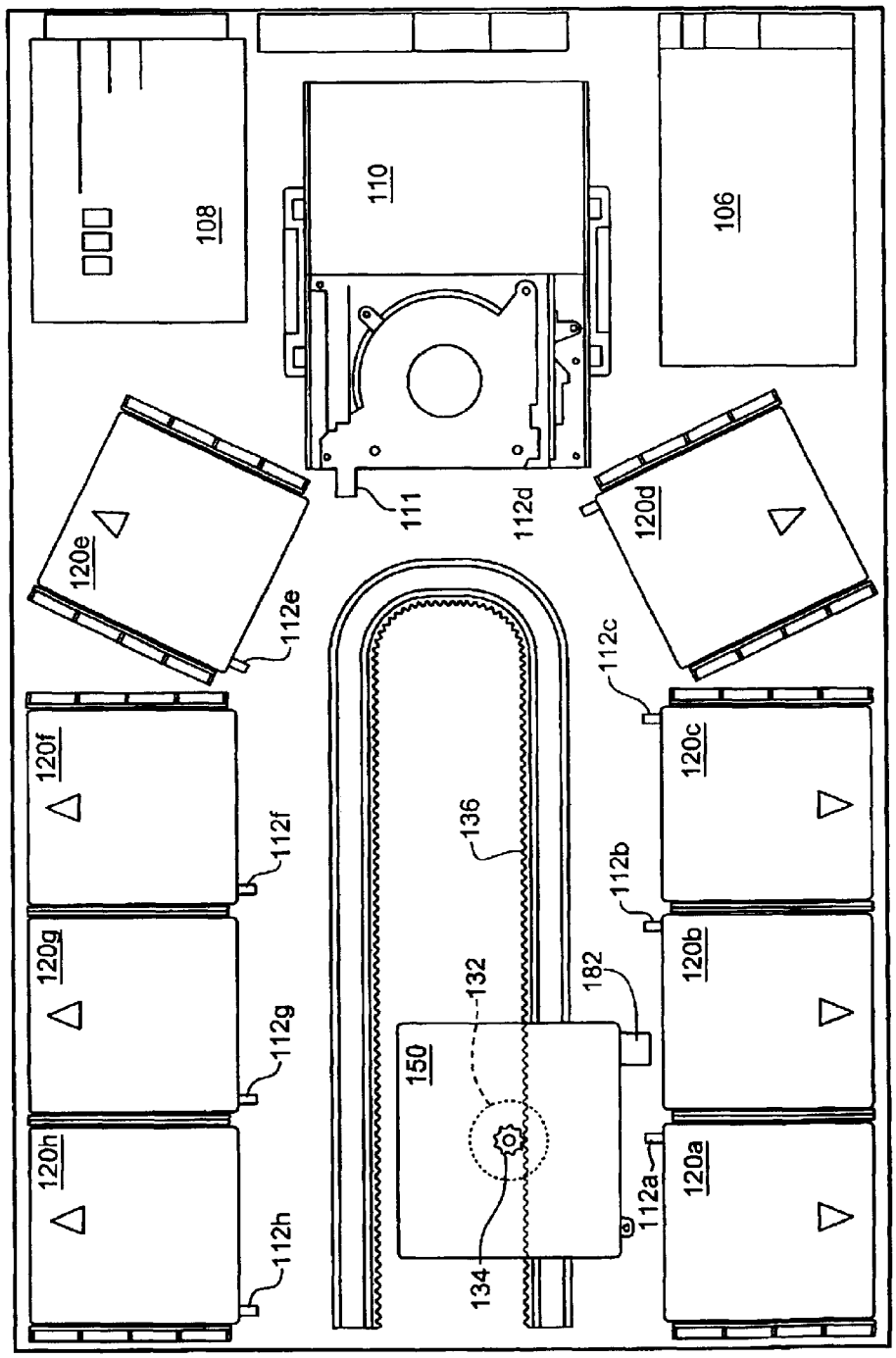
FIG. 2 illustrates another top view of the present one and three quarter form factor tape cartridge autoloader.

Referring to FIG. 1, the present tape cartridge autoloader 100 comprises a single tape drive 110 and tape cartridge storage cells 102a–102h for up to eight tape cartridges 120a–120h all located within a form factor of height one and three-quarters inches. A picker 150 for transporting one of the tape cartridges to the tape drive 110 travels on a U-shaped picker track 130 located in the center of the taps cartridge autoloader 100 with four of the eight tape cartridge storage cells 102a–102h located on each side of the U-shaped picker track 130. The tape drive is located between the two rows of tape cartridge storage cells 102a–102d and 102e–102h at the rear of the tape cartridge autoloader 100. The opening of the tape drive 110 faces the U-shaped picker track 130 for inserting and extracting the tape cartridge. The first tape cartridge storage cell 102a may be a drawer that slides in and out of the tape cartridge autoloader 100 on storage cell track 104 for loading and unloading, one at a time, the tape cartridges. An opening in the front panel 90 of the tape cartridge autoloader provides the access required for sliding the tape cartridge storage cell 102a into and out of the tape cartridge autoloader 100 as shown in FIG. 2. The front panel may include a means for securing the retractable storage cell when the retractable storage cell is retracted into the tape cartridge autoloader.

Referring to FIG. 2, the tape cartridge autoloader may also include a power source 106 for supplying power to the tape drive 110, the picker motors (not shown) and other operational components not illustrated, and a control circuit having a processor and memory for executing an operational program for operating the tape cartridge autoloader in accordance with the following description. A control panel 80 (not shown) in the center of the front panel allows the user to control the operation of the tape cartridge autoloader. The control panel may include such operational controls as an open/close button for inserting and ejecting tape cartridges and a display to provide information to the user.

While the present one and three quarter form factor tape cartridge autoloader is illustrated and hereafter described having a retractable storage cell that slides into and out of the one and three quarter form factor tape cartridge autoloader, however a removable magazine holding more than one tape cartridge may be substituted. Likewise, a second door may be located on the left side of the front panel for loading/unloading of a retractable storage cell or removable magazine or a single door on the left side may be substituted.

The one and three quarter form factor tape cartridge autoloader may be mounted in a standard computer equipment rack with the front plate, and therefore the retractable storage cell or removable magazine and control panel, readily accessible to the user. Allowing one of the tape cartridge storage cell to slide into and out of the one and three quarter form factor tape cartridge autoloader allows the user to insert or change individual tape cartridges, unlike prior art tape cartridge autoloaders that require the user to remove a magazine of tape cartridges when a single tape cartridge requires replacement. The front plate 90 of the tape cartridge autoloader may include a control panel 80 to allow the user to select operational characteristics such as loading or unloading a tape cartridge. When tape cartridges are inserted into the tape cartridge autoloader, the tape cartridge is transferring to a storage cell and the control circuit processor records the tape cartridge and the storage cell in which the tape cartridge is located.

The location of the tape cartridge storage cells 1021–102h and the tape drive 110 around the U-shaped picker track 130 decreases the height of the tape cartridge autoloader. It also provides a tape cartridge picker assembly that is less complex than previous tape cartridge autoloaders, thus reducing the cost and increasing the reliability of the present one and three quarter form factor tape cartridge autoloader.

Figure 3:
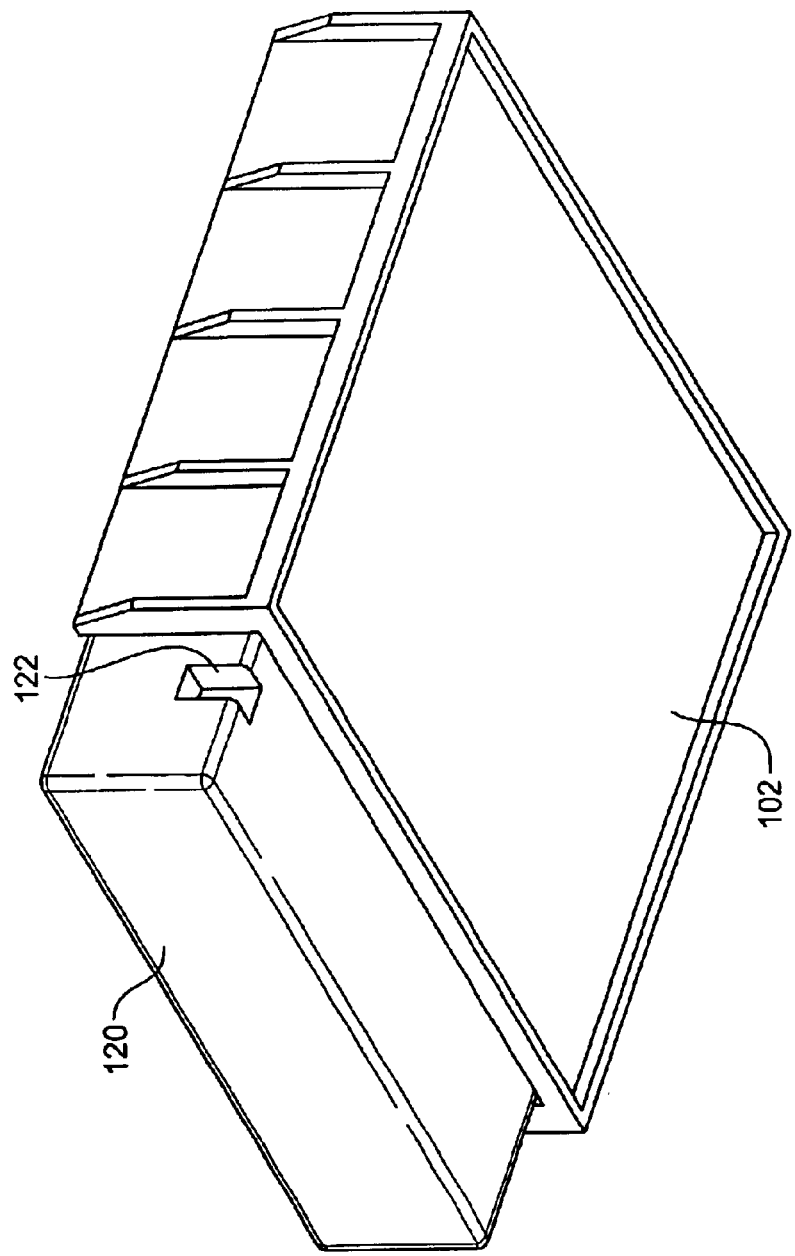
FIG. 3 illustrates an exploded view of the tape cartridge storage cell in accordance with the present one and three quarter form factor tape cartridge autoloader.

Tape Cartridge Storage Cell—FIGS. 1, 2 and 3

The tape cartridge storage cells 102a–102h provide storage locations for up to eight tape cartridges 120a–120h. Each tape cartridge storage cell comprises a base and three sides extending upward from the base for horizontally holding a tape cartridge. The tape cartridge storage cell is shorter than a tape cartridge to allow one end of the tape cartridge to extend beyond the tape cartridge storage cell for access by the picker 150. Referring to the exploded perspective view of the tape cartridge storage cell with a tape cartridge therein of FIG. 3, a loading notch 122 or indentation, in the die of the tape cartridge allows a loading hook to move the tape cartridge into and out of the tape cartridge storage cell. The sides of the tape cartridge storage cell are approximately the height of the tape cartridge such that the height of the tape cartridge autoloader is not unduly influenced by the height of the tape cartridge storage cells. The tape cartridge storage cells are fixedly attached to the base of the chassis by a fastening means (not shown). The height of the tape cartridge is approximately one inch, thus the overall height of the tape cartridge storage cell mounted to the base of the tape cartridge autoloader is slightly more than one inch, fitting with the 1.75 inch height of the 1U form factor.

Referring back to FIG. 1, seven of the eight tape cartridge storage cells are stationary while one of the tape cartridge storage cells located on the right side of the tape cartridge autoloader 100 slides on a storage cell track 104 as shown in FIG. 1.

Sliding the first tape cartridge storage cell, tape cartridge storage cell 102a in FIG. 1, into and out of the tape cartridge autoloader allows the user to insert/extract one tape cartridge 120 into/out of the tape cartridge autoloader 100. When the sliding tape cartridge storage cell 102a is inserted into the tape cartridge autoloader 100, the picker 150 moves the tape cartridge to a vacant tape cartridge storage cell.

The two tape cartridge storage cells, 102d and 102e, located adjacent to the tape drive 110 are diagonally positioned such that as the picker 150 travels the arcuate area of the U-shaped picker track 130, the picker 150 and the tape cartridge storage cell are longitudinally aligned. Aligning the tape cartridge storage cells and the tape drive in a U-shaped orientation corresponding to the U-shaped picker track eliminates the need to rotate the picker to access each tape cartridge. Thus, utilizing the horizontal area within the tape cartridge autoloader to maximize the number of tape cartridge storage cells that are available for tape cartridges without increasing the height and decreasing the complexity of the operational components required to access and transport tape cartridges.

Referring to FIG. 3, each one of the tape cartridge storage cells 102a–102h may include an outwardly extending cell locator tab 112a–112h for locating the position of each tape cartridge storage cell 102a–102h. A corresponding cell locator sensing device 182 on the picker 150 provides a signal to the control circuit indicating the position of the picker. The sensingr device may include an upper light emitting source and a lower light detecting device (or vice versa). As the cell locator 112 passes between the light emitting source and the light detecting device, the light emission is temporarily blocked. When the light emission is blocked, the light detector device sends a signal to the control circuit 108 indicating that the picker 150 has moved to the next tape cartridge storage cell 102 location. In an alternative embodiment, the sensing device may include a light emitting source on the picker and a light detecting device on the cell locating tab. When the picker is aligned with the storage cell, the light detecting device sends a signal to a control circuit identifying the location of the picker.

For example, when initialized the control circuit may drive the picker to a predetermined location, such as alignment with tape cartridge storage cell 102a. Recording the starting location of the picker, the direction in which the picker is subsequently driven, and the number of cell locators that are encountered provides the information necessary determine the location of the picker as the picker travels along the U-shaped picker track.

Figure 4:
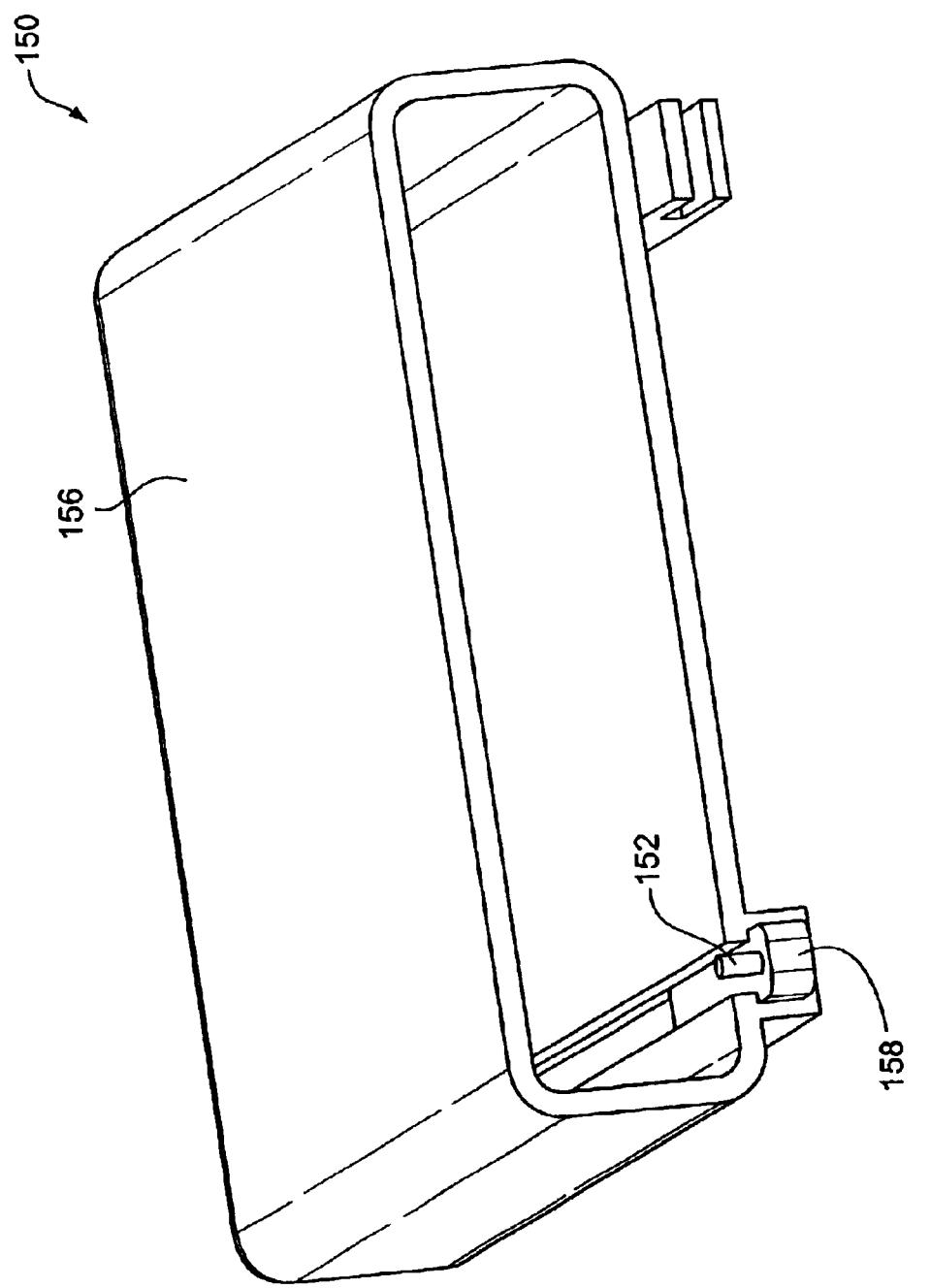
FIG. 4 illustrates a exploded perspective view of the tape cartridge transport storage cell in accordance with the present one and three quarter form factor tape cartridge autoloader.
Figure 5:
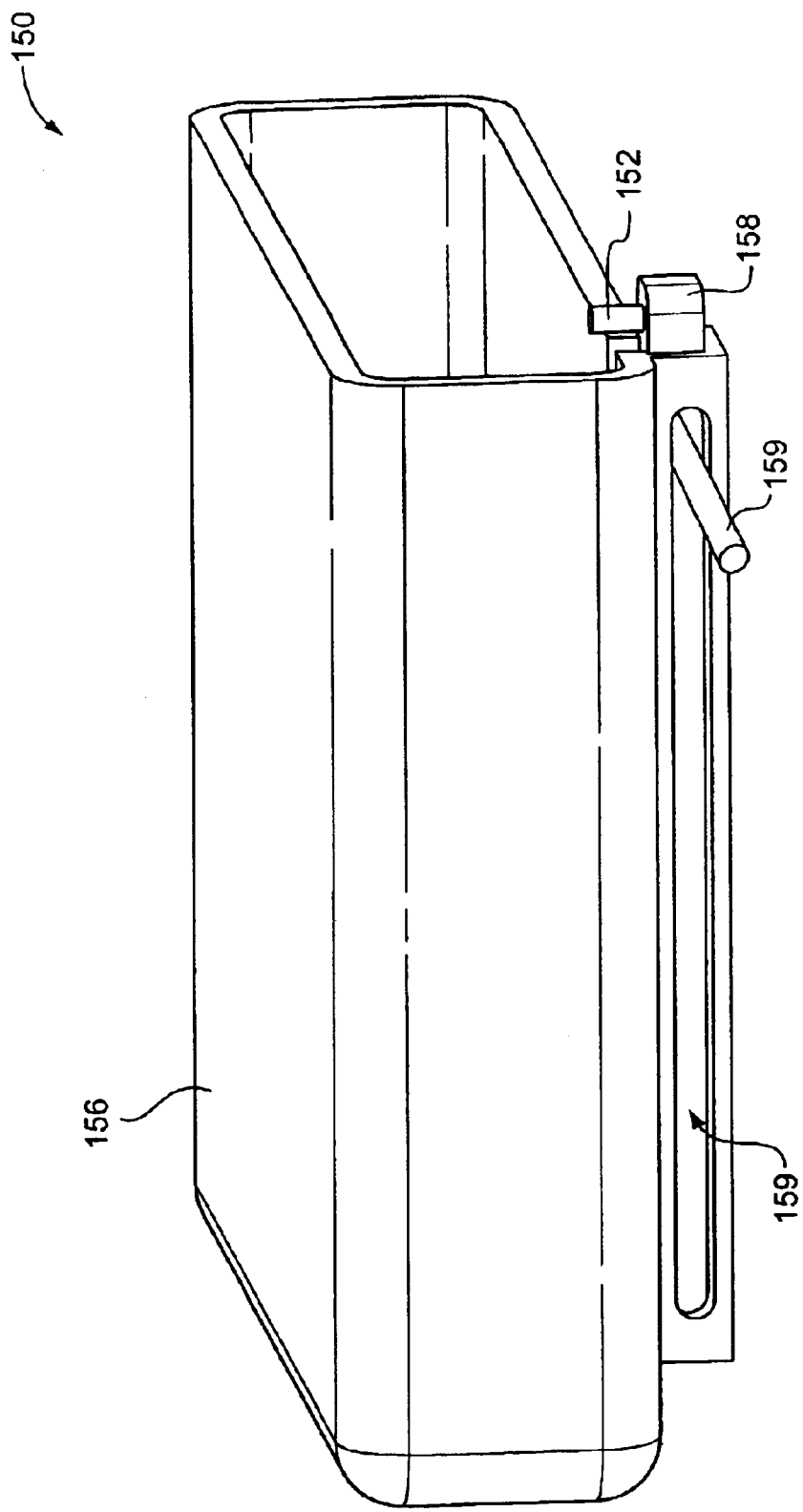
FIG. 5 illustrates a exploded perspective side view of the tape cartridge transport storage cell in accordance with the present one and three quarter form factor tape cartridge autoloader.

Tape Cartridge Movement—FIGS. 4 and 5

Movement of tape cartridges within the tape cartridge autoloader 100 is accomplished by a "picker" assembly comprising a transport storage cell 156 for housing the tape cartridge during transport, a loading hook 152 for securing a tape cartridge, and a retractable loading arm for moving the tape cartridge into and out of the transport storage cell 156. The transport storage cell 156 illustrated in FIG. 4 is a box shaped enclosure slightly larger than the tape cartridge and having a front side open for accepting the tape cartridge. The base of the tape cartridge transport storage cell 156 includes a hollow channel 155 extending outwardly from the base for sliding the retractable loading arm 158 and attached loading hook 152 into and out of the transport storage cell 156 when loading and loading the tape cartridge. While the transport storage cell is illustrated and described with an enclosed top portion, an alternative configuration may be utilized such as a transport storage cell 156 open at the top similar to the configuration of the storage cell 102. Likewise, while the loading arm channel is illustrated parallel to the left side of the transport storage cell, the loading arm channel may be alternatively located, such as placement on the right side of the transport storage cell.

Referring to the perspective views of the tape cartridge 120 in FIG. 3 and the picker 150 in FIG. 4, when the picker 150 is aligned with the storage cell 102, retractable loading arm 158 extends outward from the transport storage cell 156 toward the tape cartridge 120. When the loading hook 152 attached to retractable loading arm 158 is aligned with loading notch 122 on the side of tape cartridge 120, picker 150 moves a small distance engaging loading hook 152 and loading notch 122. Alternatively, the retractable loading arm may be extended a predetermined distance as the picker approaches the tape cartridge storage cell. Once engaged, retractable loading arm 158 is drawn into the transport storage cell 156 pulling tape cartridge 120 into the transport storage cell 156. Conversely, the tape cartridge 120 is extracted from the transport storage cell 156 by moving the retractable loading arm 158 out of the transport storage cell 156 a predetermined distance.

Figure 6:
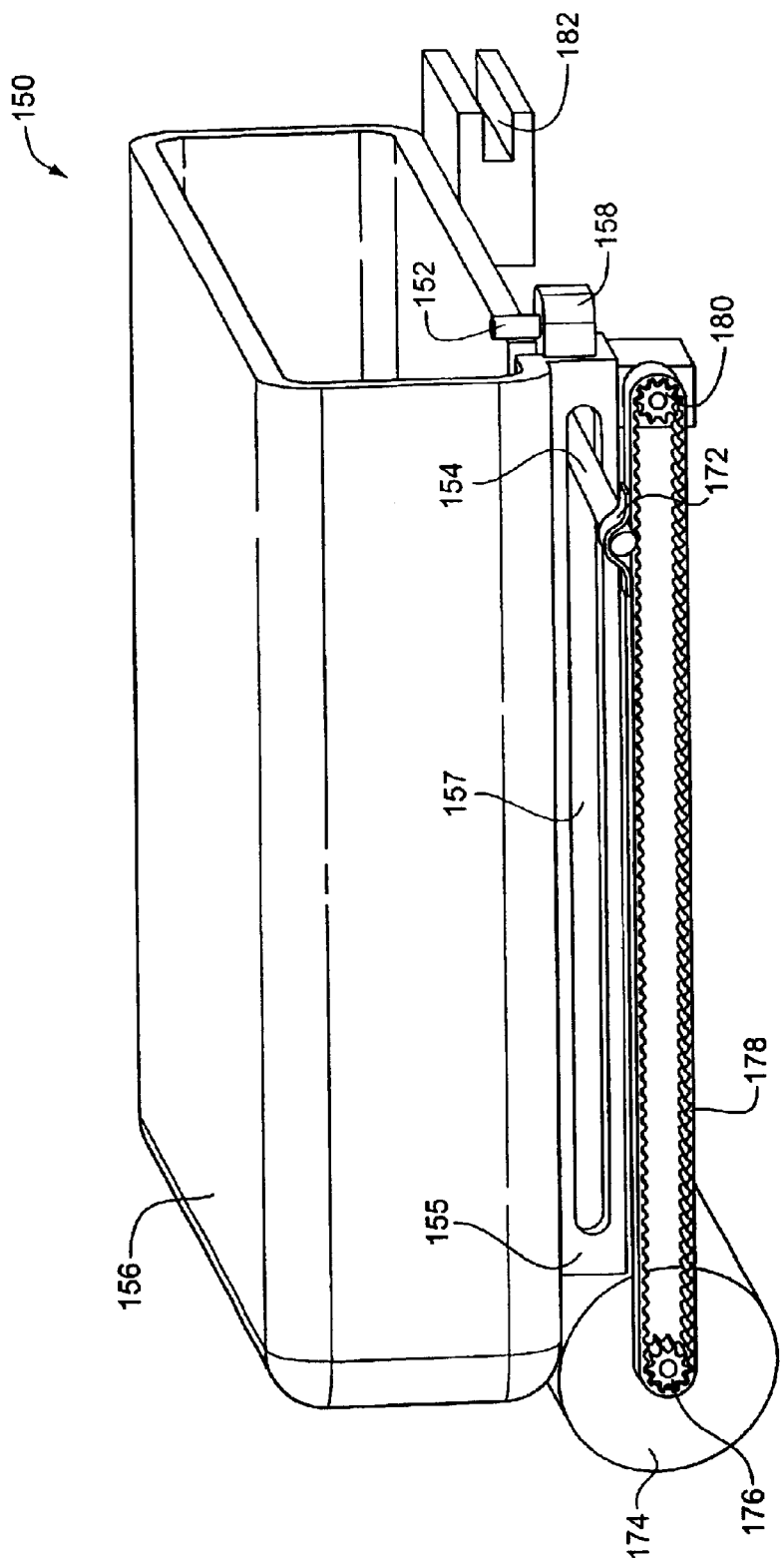
FIG. 6 illustrates another exploded perspective side view of the tape cartridge transport storage cell with operational components in accordance with the present one and three quarter form factor tape cartridge autoloader.

Picker Operational Characteristics—FIGS. 2, 5 and 6

Referring to the side view of the picker in FIG. 5, movement of retractable loading arm 158 into and out of the transport storage cell 156 is accomplished by moving loading arm actuator 159 that extends outwardly from the side of the hollow channel 155. The retractable loading arm is perpendicularly attached to actuator such that as the retractable loading arm actuator 159 is moved back and forth, the retractable loading arm 158 moves into and out of the transport storage cell 158. A slot 157 in one side of channel 155 allows the retractable loading arm actuator 159 to protrude outward from the channel 155.

Referring to the exploded perspective side view of the picker with corresponding operational components of FIG. 6, insertion and extraction of the tape cartridge into and out of the transport storage cell is accomplished utilizing a motor driven belt assembly. Loading motor 172 and idle gear 180 are attached near opposite ends of channel 155. A circular toothed belt 178 is wrapped between a drive gear 176 attached to the shaft of loading motor 174 and the idle gear 180. In response to control signals from controller circuit 108, drive gear 174 is driven clockwise or counter-clockwise by loading motor 174. Actuator hook 172 attached to toothed loading belt 187 pulls/pushes the loading arm actuator 159 to draw the retractable loading arm 158 into and out of the transport cell 156. Once a tape cartridge is loaded into the picker transport storage cell, the picker transports the tape cartridge to the tape drive.

Figure 7:
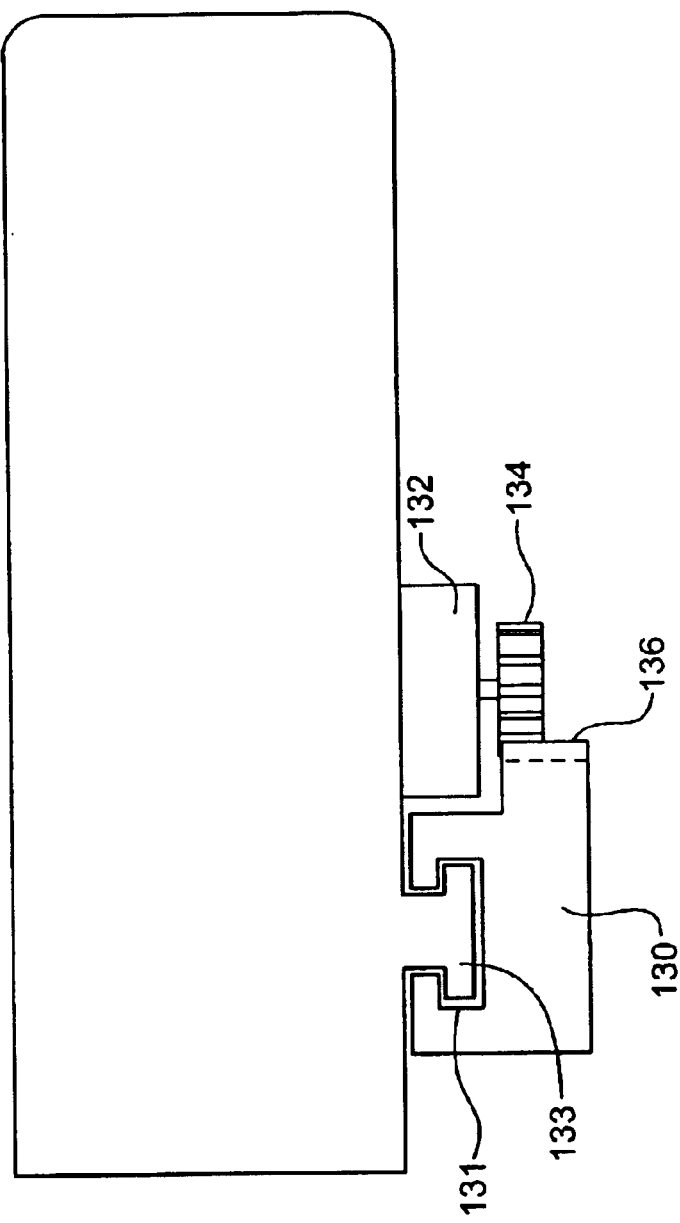
FIG. 7 illustrates a side view of the tape cartridge transport storage cell interfacing with the U-shaped picker track in accordance with the present one and three quarter form factor tape cartridge autoloader.

Referring to the top view of the tape cartridge autoloader of FIG. 2, the tape cartridge autoloader 100 includes a U-shaped picker track 130 on which picker 150 travels for moving tape cartridges 120a–120h within the tape cartridge autoloader 100. Referring to the side view of the picker illustrated in FIG. 7, the U-shaped picker track 130 includes a partially enclosed channel, or cam 131 which corresponds to T-shaped peg 133 protruding from the base of the picker 150. As the picker 150 travels around the U-shaped picker track 130, the T-shaped peg 133 follows the cam 131. One side, the interior side in FIG. 2, of the picker track 130 is a toothed track 136. Operationally, a picker motor 132 attached to the base of picker 150 drives a pinion gear 134 which in turn moves the picker 150 as the gears of the pinion gear 134 engage the toothed track 136.

Placement of the picker motor on the base of the picker next to the actuator motor reduces the overall height of the tape cartridge autoloader. The height of a standard single reel tape cartridge is approximately one inch, therefore the height of the tape cartridge storage cell is slightly more than one inch, leaving approximately a 0.75 inch area below the picker transport cell for the picker operational components. Placement of the U-shaped picker track, picker motor and the loading arm actuator motor approximately adjacent to each other allows the picker and the picker operational components to conform to the 1.75-inch height of the 1U form factor.

Motors are a very costly part of a tape cartridge autoloader. Decreasing the number of movements required to access and transport tape cartridges reduces the number of motors. The present one and three quarter form factor tape cartridge autoloader requires only two motors since only two movements are required, movement of the picker around the U-shaped picker track and movement of the retractable loading arm into and out of the transport storage cell. Decreasing the number of motors required to operate the present one and three quarter form factor tape cartridge autoloader also improves the reliability of the one and three quarter form factor tape cartridge autoloader by minimizing the number of moving parts.

Autoloader Operational Characteristics—FIGS. 1, 2, 6 and 8

Figure 8:
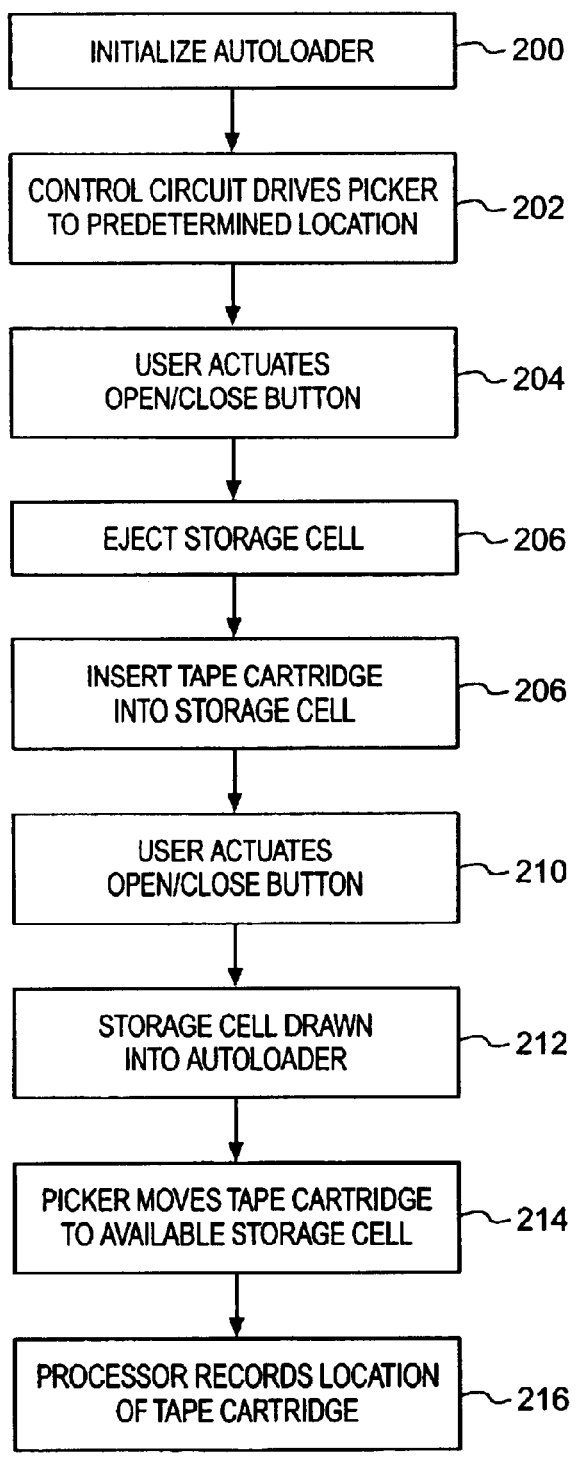
FIG. 8 is an operational flow diagram in accordance the present one and three quarter form factor tape cartridge autoloader.

Referring to the operational flow diagram of FIG. 8, when the tape cartridge autoloader is initialized in step 200, the control circuit drives the picker to a predetermined location in step 202. In response to a user request to insert a tape cartridge in step 204, the control circuit ejects the tape cartridge storage cell in step 206. After the user places a tape cartridge in the ejected storage cell in step 208 and actuates the open/close button on the control panel, the control circuit draws the tape cartridge storage cell into the tape cartridge autoloader in step 210. Once the sliding tape cartridge storage cell is drawn into the tape cartridge autoloader in step 210, the tape cartridge is moved to a vacant tape cartridge storage cell in step 212.

Figure 9:
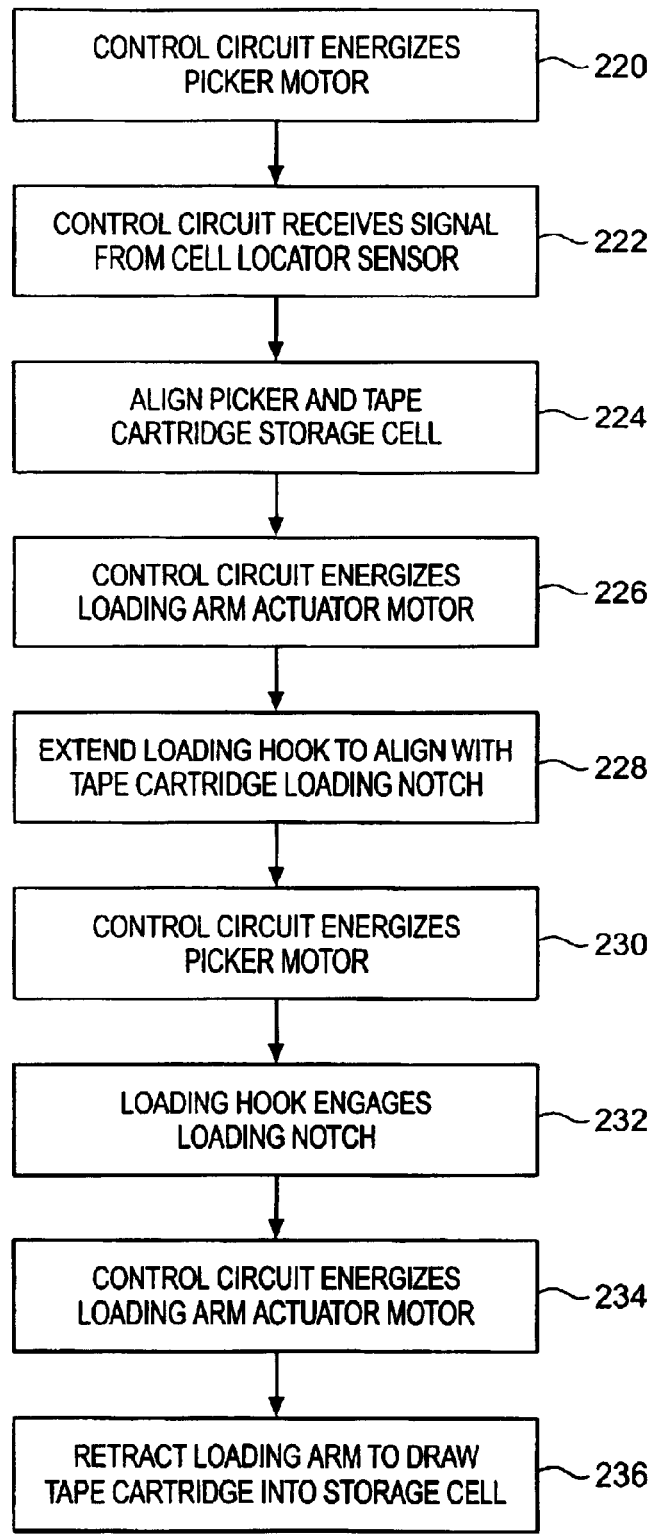
FIG. 9 is an operational flow diagram in accordance the present one and three quarter form factor tape cartridge autoloader.

Referring to the operational flow diagram of FIG. 9, movement of the inserted tape cartridge into an available tape cartridge storage cell begins with transferring the inserted tape cartridge from the tape cartridge storage cell to the picker transport cell. This is accomplished by aligning the picker with the first tape cartridge storage cell in step 224 according to the sensing signal received from the light detecting device in step 222. In step 220 the control circuit energizes the picker motor to move the picker in toward the first tape cartridge storage cell. The picker is aligned with the storage cell such that the retractable loading arm and attached loading hook, when extended, aligns with the loading notch located in the side of the tape cartridge. Once the picker is aligned in step 224, the control circuit energized the loading arm actuator motor in step 226 to align the loading hook with the loading notch in step 228. The control circuit further energized the picker motor in step 230 to move the move the picker a predetermined distance for the loading hook to engage the loading notch in step 232. In step 234 the control circuit energizes the loading arm actuator motor to draw the tape cartridge out of the first tape cartridge storage cell and into the picker tape cartridge storage cell in step 236.

Operationally, two movements are required to operate the preset one and three quarter form factor tape cartridge autoloader. The tape cartridge picker travels around the U-shaped picker track, requiring one picker motor to align the picker with the tape cartridge storage cells and the tape drive. A second motor, the loading arm actuator motor, moves the transport cell retractable loading arm to insert and extract tape cartridges. Reducing the complexity of the present one and three quarter form factor tape cartridge autoloader translates to fewer operational components. Placement of the operational components approximately adjacent to one another and below the picker, reduces the height of the tape cartridge autoloader to conform to a standard 1U form factor. Reducing the number of motors and thus moving components also improves the reliability of the present one and three quarter form factor tape cartridge autoloader.

Alternative embodiments will occur to those skilled in the art. Although the one and three quarter form factor tape cartridge autoloader has been described for use with one-inch tape cartridges, alternative tape cartridges could be substituted. Similarly, although embodiments were described and illustrated inserting one tape cartridge, alternative multiple tape cartridge removable magazines could be used. Such variations and alternatives are contemplated, and can be made without departing from the spirit and scope of the invention claimed in the appended claims.

It is apparent that there has been described, a one and three quarter form factor tape cartridge autoloader that fully satisfies the objects, aims, and advantages set forth above. While the one and three quarter form factor tape cartridge autoloader has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A tape cartridge autoloader sized to fit within a full height one and three-quarter inch form factor, comprising:
    a U-shaped track centrally located in the tape cartridge autoloader;
    a tape drive having a tape cartridge aperture for inserting/extracting a plurality of tape cartridges, one at a time;
    a plurality of respective spaced positions for storing the plurality of tape cartridges, wherein the plurality of respective spaced positions and the tape drive are horizontally positioned in a U-shape corresponding to and around the U-shaped track with the tape drive being centrally located at the rear of the U-shaped track;
    a means for transporting a predetermined one of the plurality of tape cartridges between one of the plurality of respective spaced positions and the tape drive; and
    wherein as the transport means travels along the U-shaped track, the means for transport is aligned with one of the tape drive and the plurality of respective spaced positions.

2. The tape cartridge autoloader of claim 1 wherein the transport means comprises:
    a transport call for holding the predetermined one of the plurality of tape cartridges as the predetermined one of the plurality of tape cartridges is transported between one of the plurality of respective spaced positions and the tape drive;
    a means for inserting/extracting the predetermined one of the plurality of tape cartridges into/out of the transport cell, and
    a drive assembly driven by a single motor connected to the transport cell and interfacing with the U-shaped track for moving the transport cell between the plurality of respective spaced positions and the tape drive.

3. The tape cartridge autoloader of claim 2 wherein the means for inserting/extracting comprises:
    a retractable arm connected to the transport means for moving the predetermined one of the tape cartridges into/out of the transport means; and
    an actuator means driven by a single motor for extending/retracting the retractable arm.

4. The tap cartridge autoloader of claim 1 further comprising:
    a means for positioning the transport means at a predetermined one of the plurality of respective spaced positions and the tape drive.

5. The tape cartridge autoloader of claim 4 wherein the positioning means comprises:
    a sensing device connected to the transport means; and
    plurality of locator means, each one of the plurality of locating means connected to one of the plurality of respective spaced positions and the tape drive, wherein as the transport means travels around the U-shaped track the sensing means engages with the locator means to locate each one of the plurality of respective spaced positions and the tape drive.

6. A tape cartridge autoloader comprising:
    a generally rectangular outer housing sized to fit within a full height one and three quarter inch form factor, the outer housing having a front panel;
    a means for loading/unloading a plurality of tape cartridges to/from the tape cartridge autoloader through an aperture in the front panel of the outer housing;
    a tape drive having a tape cartridge aperture for inserting/extracting the plurality tape cartridges, one at a time, the tape drive centrally located at the rear of the outer housing;
    a U-shaped track centrally located in front of the tape drive such that an arcuate end of the U-shaped track is longitudinally aligned with the tape cartridge aperture;
    a plurality of respective spaced positions for storing the plurality of taps cartridges, wherein the plurality of respective spaced positions and the tape drive are horizontally positioned in a U-shape corresponding to and around the U-shaped track;

a means for transporting a predetermined one of the plurality of tape cartridges between one of the plurality of respective spaced positions and the tape drive; and wherein as the transport means travels along the U-shaped track, the transport means is aligned with one of the tape drive and the plurality of respective spaced positions.

7. The tape cartridge autoloader of claim 6 wherein the loading/unloading means comprises:

retractable storage means for loading/unloading the plurality of tape cartridges to/from the tape cartridge autoloader;

a means for sliding the retractable storage means into/out of the tape cartridge autoloader.

8. The tape cartridge autoloader of claim 7 wherein the retractable storage means comprises:

a drawer mounted for sliding between a retracted position in which the drawer is contained within the outer housing and an extended position in which the drawer extends beyond the front panel of the outer housing;

a means for retracting the drawer from the outer housing; and a means for securing the drawer in place when the drawer is retracted into the tape cartridge autoloader.

9. The tape cartridge autoloader of claim 8 wherein the drawer is a removable magazine for loading/unloading one or more tape cartridges.

10. The tape cartridge autoloader of claim 6 wherein the transport means comprises:

a transport cell for holding the predetermined one of the plurality of tape cartridges a the predetermined one of the plurality of tape cartridges is transported between one of the plurality of respective spaced positions and the tape drive;

a means for inserting/extracting the predetermined one of the plurality of tape cartridges into/out of the transport cell, and a drive assembly driven by a single motor connected to the transport cell and interfacing with the U-shaped track for moving the transport cell between the plurality of respective spaced positions and the tape drive.

11. The tape cartridge autoloader of claim 10 wherein the means for inserting/extracting comprises:

a retractable arm connected to the transport means for moving the predetermined one of the tape cartridges into/out of the transport means; and an actuator means driven by a single motor for extending/retracting the retractable arm.

12. The tape cartridge autoloader of claim 6 further comprising:

a means for positioning the transport means at a predetermined one of the plurality of respective spaced positions and the tape drive.

13. The tape cartridge autoloader of claim 12 wherein the positioning means comprises:

a sensing device connected to the transport means; and a plurality of locator means, each one of the plurality of locating means connected to one of the plurality of respective spaced positions and the tape drive, wherein as the transport means travels around the U-shaped track the sensing means engages with the locator means to locate each one of the plurality of respective spaced positions and the tape drive.

14. A tape cartridge autoloader comprising:

a generally rectangular chassis sized to fit within a full height one end three quarter inch form factor, the chassis having a front panel;

a tape cartridge loading/unloading means;

a tape drive having a tape cartridge aperture for inserting/extracting the plurality tape cartridges, one at a time, the tape drive centrally located at the rear of the chassis;

a U-shaped back centrally located in front of the tape drive such that an arcuate end of the U-shaped track is longitudinally aligned with the tape cartridge aperture;

a plurality of means for storing the plurality of tape cartridges, wherein the plurality of storage means include an open side for inserting/extracting one of the plurality of tape cartridges and the tape drive and the plurality of storage means are horizontally orientated in a U-shape corresponding to and around the U-shaped track;

a means for transferring a predetermined one of the plurality of tape cartridges between one of the plurality of storage means and the tape drive, wherein as the transferring means travels along the U-shaped track, the transferring means is aligned with the tape drive and the plurality of storage means; and a drive mechanism driven by a single motor for moving the transfer means around the U-shaped track, the drive mechanism connected to the transfer means and interfacing with the U-shaped track.

15. The tape cartridge autoloader of claim 14 wherein the tape cartridge loading/unloading means comprises:

a retractable storage means movable between a retracted position within the chassis and an extended position in which a portion of the retractable storage means extends beyond the front panel of the chassis for loading/unloading, one at a time, the plurality of tape cartridges, wherein the retractable storage means is one of the plurality of storage means;

a means for retracting the retractable storage means from the chassis; and a means for securing the retractable storage means in place when the retractable storage means is retracted into the chassis.

16. The tape cartridge autoloader of claim 15 further comprising:

a sensing means for positioning the transfer means at a predetermined one of the plurality of storage means and the tape drive.

17. The tape cartridge autoloader of claim 14 wherein the tape cartridge loading means comprises:

a removable magazine for loading/unloading one or more of the plurality of taps cartridges, wherein the removable magazine is a portion of the plurality of storage means;

a means for sliding the removable magazine into/out of the chassis, wherein the removable magazine includes one or more of the plurality of storage means; and a means for securing the removable magazine when the removable magazine is inserted into the chassis.

18. The tape cartridge autoloader of claim 14 wherein the means for transferring comprises:

a transport cell for holding the predetermined one of the plurality of tape cartridges;

a retractable picker means connected to the transport cell for transferring the predetermined one of the plurality of tape cartridges into/out of the transport cell; and a drive mechanism driven by a single motor for moving the transport cell around the U-shaped truck.

19. A method of engaging a predetermined one of a plurality of tape cartridges with a tape drive of which the plurality of tape cartridges and the tape drive area located within a tape cartridge autoloader conforming to a one and three quarter inch height form factor, the method comprising:

loading at least one of the plurality of tape cartridges into at least one of a plurality of respective spaced positions within the tape cartridge autoloader; wherein said loading comprises:

extracting a retractable storage cell from the tape cartridge autoloader, loading the plurality of tape cartridges into the retractable storage cell, one at a time;

retracting the retractable storage cell into the tape cartridge autoloader; and transferring the plurality of tape cartridges, one at a time, to a one of the plurality of respective spaced positions; and transferring the predetermined one of the plurality of tape cartridges from a predetermined one of the plurality of respective spaced positions to the tape drive via a transport mechanism, comprising:

inserting the predetermined one of the plurality of tape cartridges into the transport mechanism; and moving the transport mechanism with a single motor through a set of gears between the predetermined one of the plurality of respective spaced positions and the tape drive.

20. The method of claim 19 wherein said inserting comprises:

extending a retractable arm from the transport mechanism with a single motor driven belt through a set of gears; and retracting the retractable arm to pull the predetermined one of the plurality of tape cartridges from a predetermined one of the plurality of respective spaced positions to the transport mechanism.

\* \* \* \* \*